(12) United States Patent
Visweswaraiah (10) Patent No.: US 7,167,478 B2
(45) Date of Patent: Jan. 23, 2007

(54) VERSATILE SYSTEM FOR MESSAGE SCHEDULING WITHIN A PACKET OPERATING SYSTEM

(75) Inventor: Vikram Visweswaraiah, Goleta, CA (US)

(73) Assignee: Ericsson Inc., Plano, TX (US)

( * ) Notice: Subject to any disclaimer, the term of this patent is extended or adjusted under 35 U.S.C. 154(b) by 1032 days.

(21) Appl. No.: 10/244,360

(22) Filed: Sep. 16, 2002

(65) Prior Publication Data

US 2004/0052262 A1 Mar. 18, 2004

(51) Int. Cl.
H04L 12/28 (2006.01)
(52) U.S. Cl. .................... 370/395.4; 370/229
(58) Field of Classification Search ............. 370/229, 370/230, 235, 252, 389, 391, 392, 394, 395.4, 370/395.42, 428
See application file for complete search history.

(56) References Cited

U.S. PATENT DOCUMENTS

| | | | |
|---|---|---|---|
| 5,218,676 A | 6/1993 | Ben-Ayed et al. | 395/200 |
| 6,205,150 B1 * | 3/2001 | Ruszczyk | 370/412 |
| 6,526,062 B1 * | 2/2003 | Milliken et al. | 370/395.42 |
| 6,754,215 B1 * | 6/2004 | Arikawa et al. | 370/395.4 |
| 2002/0118683 A1 | 8/2002 | Narayana et al. | |

FOREIGN PATENT DOCUMENTS

| | | |
|---|---|---|
| EP | 1009106 A2 | 6/2000 |
| EP | 1009106 A3 | 5/2001 |
| EP | 1 191 748 A | 3/2002 |
| JP | 08036553 | 2/1996 |
| KR | 2001038486 | 5/2001 |
| SU | 935940 | 6/1982 |
| SU | 935940 A1 | 6/1982 |
| WO | WO-94/16397 A2 | 12/1994 |
| WO | WO-00/38375 A1 | 6/2000 |
| WO | WO 03/017593 A | 2/2002 |
| WO | WO 02/069571 A | 9/2002 |

OTHER PUBLICATIONS

Giroux N et al: "Queuing and Scheduling;Quality of service in ATM networks, Ch. 5" Quality of Service in ATM Networks: State-Of-The-Art Traffic, XX, XX, 1998, pp. 85-121, XP002260612 p. 96, line 11—p. 105, line 32.

Luo K et al: "Boosting SMT performance by speculatin control "Parallel and Distributed Processing Symposium., Proceedings 15th International San Francisco, CA, USA 23-27 Apr. 2001, Los Alamitos, CA, USA, IEEE Comput. Soc, US, Apr. 23, 2001, p. 9pp, XP010544357 ISBN: 0-7695-0990-8 p. 4, right-hand column, line 3-line 20.

* cited by examiner

Primary Examiner—Brenda Pham (57) ABSTRACT

The present invention provides a system for producing a packet delivery schedule, based on desired priority and weighting characterizations of the packet traffic. A number of prioritization schemes are systematically and efficiently reduce to reliable, repeatable schedules. The system accepts two sequences of inputs, based on desired message classification scales. The system begins counting through the sequences, based on their relationships to one another, to determine when to add a member of either scale to a schedule. The system may be designed to terminate the schedule after a fixed number of countings, or may be repeated iteratively as desired. Once a schedule is completed, the system may continue producing other schedules, utilizing different classification scales, until all classification scales have been comprehended. The resulting schedules are systematically combined to produce a single schedule comprehending all desired classification scales. This system can be implemented in hardware, software, or a combination of both.

17 Claims, 4 Drawing Sheets

VERSATILE SYSTEM FOR MESSAGE SCHEDULING WITHIN A PACKET OPERATING SYSTEM

TECHNICAL FIELD OF THE INVENTION

The present invention relates generally to the field of communications and, more particularly, to a versatile system for scheduling the routing of messages within a packet operating system.

BACKGROUND OF THE INVENTION

The increasing demand for data communications has fostered the development of techniques that provide more cost-effective and efficient means of using communication networks to handle more information and new types of information. One such technique is to segment the information, which may be a voice or data communication, into packets. A packet is typically a group of binary digits, including both data and control information. Integrated packet networks (typically fast packet networks) are generally used to carry at least two (2) classes of traffic, which may include, for example, constant bit-rate ("CBR"), speech ("Packet Voice"), data ("Framed Data"), image, and so forth. A packet network comprises packet devices that source, sink and/or forward protocol packets. Each packet has a well-defined format and consists of one or more packet headers and some data. The header contains information that gives control and address information, such as the source and destination of the packet.

A single packet device may source, sink or forward protocol packets. The elements (software or hardware) that provide the packet processing within the packet operating system are known as function instances. Function instances are combined together to provide the appropriate stack instances to source, sink and forward the packets within the device. Routing of packets (or messages) to the proper function instance for processing is limited by the capacity of central processing units ("CPU"), hardware forwarding devices, or interconnect switching capacity within the packet device. Such processing constraints cause congestion and Quality of Service ("QoS") problems inside the packet device.

The packet device may require the management of complex dynamic protocol stacks, which may be within any one layer in the protocol stack, or may be due to a large number of (potentially embedded) stack layers. In addition, the packet device may need instances of the stack to be created and torn down very frequently according to some control protocol. The packet device may also need to partition functionality into multiple virtual devices within the single physical unit to provide virtual private network (VPN) services. For example, the packet device may need to provide many hundreds of thousands of stack instances and/or many thousands of virtual devices.

The transfer and processing of packets across a packet network may require any of the associated devices to queue a variety of message traffic, either for packet routing or storage purposes. Different types of messages will have different processing and transport priorities. In order to efficiently allocate and utilize resources, the network must have a sustainable and predictable scheduling scheme, preferably one that comprehends and optimizes message prioritization. Depending upon the topology and functionality of the network, message prioritization may require a multidimensional classification scheme—where a message within a VPN can be prioritized in relation to other messages within that VPN and multiple VPNs can be prioritized in relation to each other—providing the ability to schedule message traffic according to multiple independent scales (e.g., priority or weighting classifications).

Accordingly, there is a need for versatile system for routing messages within a packet operating system that improves system performance and reliability, is easy to operate and maintain, and provides reliable, repeatable scheduling based on a desired multidimensional message classification scheme.

SUMMARY OF THE INVENTION

The versatile system for routing messages within a packet operating system in accordance with the present invention provides a countdown process for developing a messaging schedule adhering to desired prioritization in multiple dimensions, specifying priority utilizing a variety of weighting schemes. The present invention improves system performance and reliability, is easy to operate and maintain, and provides reliable, repeatable scheduling based on multidimensional classification scales. A wide variety of prioritization schemes are systematically and efficiently rendered, by the countdown process, into reliable schedules. Schedules generated by the countdown process, based on differing classification schemes, are then efficiently combined into a single, repeatable schedule. Reliability is improved by the consistent, systematic processing of the system.

The countdown process accepts two sequences of inputs, based on two desired message classification scales. The classification scales are generally selected and interrelated such that one corresponds to priority and the other to weighting, such that lower weighting corresponds to higher priority. The process then begins counting down the weights in a round robin scheme. Once a weight reaches zero, the corresponding priority is added to the schedule and the weight value is reset to its original value. The countdown process rotates through until all weights simultaneously reach zero, completing the schedule. All scale values reset and the schedule may then be repeated or terminated. Knowing the number of elements in each of the classification scales, the number of countdown iterations necessary to produce a desired schedule is easily determined. Once the schedule is completed, the process is repeated utilizing different classification scales until all classification scales have been comprehended. The resulting schedules are systematically combined in multidimensional manner until a single schedule comprehending all desired classification scales is produced.

The present invention provides a system for scheduling packet transfer in a packet network. The system comprises a primary packet characterization scale, having a number of elements, and a secondary packet characterization scale, having a number of elements. A count down process produces a packet transfer schedule by associating an element of the first characterization scale with at least one element of the second characterization scale. The count down process adds an element of the second characterization scale to the packet transfer schedule based on a counting of the elements of the first characterization scale.

The present invention also provides a method of producing a message transfer schedule. First and second characterization scales, each having a number of elements, are provided. Each element of the first characterization scale is associated with an element of the second characterization scale. A sequential shifting through each element of the first characterization scale is used in counting down the associated elements of the second characterization scale. Finally, when its associated element of the second characterization scale has counted down to a selected value, an element of the first characterization scale is added to the schedule.

In addition, the present invention provides a method of generating a schedule for delivery of packets from a queue within a packet-based operating system. A priority scale, having one or more priority elements, is provided, as is a weighting scale having one or more weighting elements. A reset value for the weighting elements is determined. A weighting element is associated with each priority element. The value of each such associated weighting element is systematically decremented, and a priority element is added to the schedule when its associated weighting element has decremented to the reset value. The weighting element is reset to its original value. Each packet in the queue is assigned a priority element corresponding to the schedule.

Other features and advantages of the present invention shall be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. For example, in addition to telecommunications systems, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The system for routing messages within a packet operating system according to the present invention provides a countdown process for developing a messaging schedule adhering to desired priority and weighting classifications. The present invention improves system performance and reliability—providing reliable, repeatable scheduling based on multi-dimensional classification scales. A number of prioritization schemes are systematically and efficiently rendered, by the countdown process, into reliable schedules. The schedules generated by the countdown process, based on differing classification schemes, are then efficiently combined into a single, repeatable schedule. Reliability is improved by the consistent, systematic processing of the system.

The countdown process accepts two sequences of inputs, based on two desired message classification scales. The classification scales are generally selected and interrelated such that one corresponds to priority and the other to weighting, such that lower weighting corresponds to higher priority. The process then begins counting down the weights. Once a weight reaches zero, the corresponding priority is added to the schedule and the weight value is reset to its original value. The countdown process rotates through until all weights simultaneously reach zero, completing the schedule. All scale values reset and the schedule may then be repeated or terminated. Knowing the number of elements in each of the classification scales, the number of countdown iterations necessary to produce a desired schedule is easily determined. Once the schedule is completed, the process is repeated utilizing different classification scales until all classification scales have been comprehended. The resulting schedules are systematically combined in multidimensional manner until a single schedule comprehending all desired classification scales is produced.

The present invention can be implemented, in single or multiple instances, within a single packet device or across a network of packet devices. The system of the present invention may be operatively associated with only a single device or instance, or may provide scheduling service to a number of devices. For purposes of explanation and illustration, the present invention is hereafter explained within the context of an illustrative packet operating system. It should be understood, however, that the principles and teachings disclosed herein are applicable to a wide variety of applications and contexts.

Figure 1:
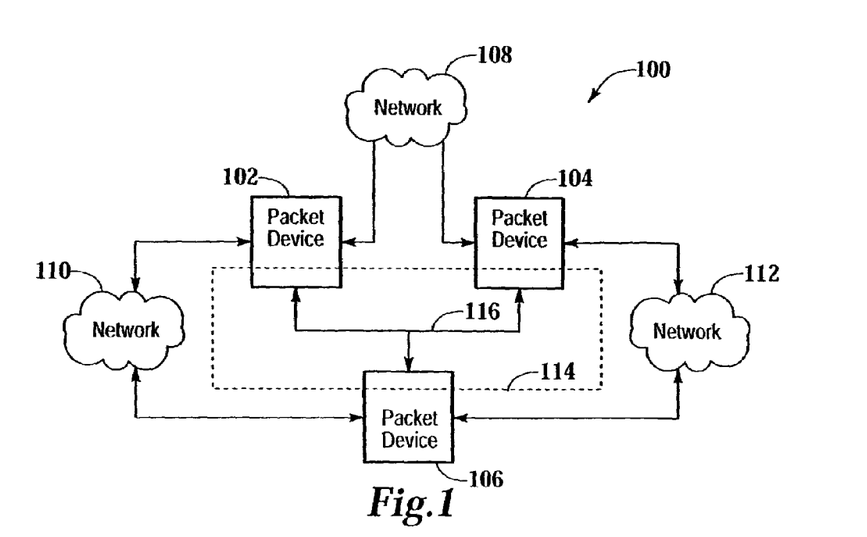
FIG. 1 is a block diagram of a network of various packet devices.

Referring now to FIG. 1, a block diagram of a packet network 100 of various packet devices is depicted. Network 100 includes packet devices 102, 104 and 106, networks 108, 110 and 112, and packet operating system 114. As shown, packet device 102 handles packetized messages, or packets, between networks 108 and 110. Packet device 104 handles messages between networks 108 and 112. Packet device 106 handles messages between networks 110 and 112. Packet devices 102, 104 and 106 are interconnected with a messaging fabric 116, which is any interconnect technology that allows the transfer of packets. Packet devices 102, 104 and 106 can be device that source, sink and/or forward message traffic, such as routers, bridges, packet switches, media gateways, network access servers, protocol gateways, firewalls, tunnel access clients, tunnel servers and mobile packet service nodes.

The packet operating system 114 includes a collection of nodes that cooperate to provide a single logical network entity (potentially containing many virtual devices). To the outside world, the packet operating system 114 appears as a single device that interconnects ingress and egress network interfaces. Each node is an addressable entity on the interconnect system, which may comprise a messaging fabric for a simple distributed embedded system (such as a backplane), a complex of individual messaging fabrics, or several distributed embedded systems (each with their own backplane) connected together with some other technology (such as fast Ethernet). Each node has an instance of a messaging agent, also called a node-messaging agent ("NMA"), that implements the transport of messages to local and remote entities (applications). The packet operating system 114 physically operates on each of packet devices or chassis 102, 104 or 106, which provide the physical environment (power, mounting, high-speed local interconnect, etc.) for the one or more nodes.

Figure 2:
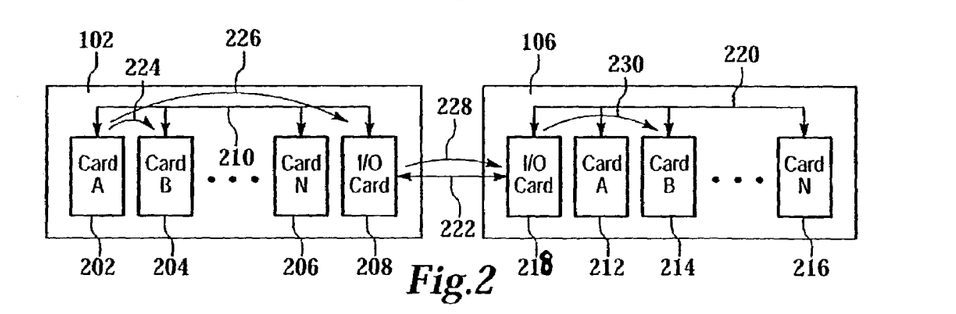
FIG. 2 is a block diagram of two packet network devices.

Referring now to FIG. 2, a block diagram of two packet network devices 102 and 106 is shown. Packet device 102 includes card A 202, card B 204, card N 206, I/O card 208 and an internal communications bus 210. Similarly, packet device 106 includes card A 212, card B 214, card N 216, I/O card 218 and an internal communications bus 220. Cards 202, 204, 206, 212, 214 and 216 are any physical or logical processing environments having function instances that transmit and/or receive local or remote messages. Packet devices 102 and 106 are communicably coupled together via I/O cards 208 and 218 and communication link 222. Communication link 222 can be a local or wide area network, such as an Ethernet connection. Communication link 222 is equivalent to messaging fabric 116 (FIG. 1).

During operation, card A 202 may have messages that do not leave card A 202. Those messages are processed locally by function instances with card A 202. Card A 202 may also send messages to other cards within the same packet device 102, such as card B 204 or card C 206. Line 224 illustrates a message being sent from card A 202 to card B 204 via internal communication bus 210. Card A 202 may also send messages to cards within other packet devices, such as packet device 106. In such a case, card A 202 (in packet device 102) sends a message to card B 214, for example, by sending the message to I/O card 208 (packet device 102) via internal communication bus 210 (packet device 102), as illustrated by line 226. I/O card 208 (packet device 102) then sends the message to I/O card 218 (packet device 106) via communication link 222, as illustrated by line 228. I/O card 218 (packet device 106) then sends the message to card B 214 (packet device 106) via communication bus 220 (packet device 106), as illustrated by line 230.

The packet operating system 114 (FIG. 1) includes one or more system control modules ("SCM") communicably coupled to one or more network interface modules ("NIM"). The SCM implements the management of any centralized function such as initiation of system initialization, core components of network management, routing protocols, call routing, etc. The system label manager is also resident on the SCM. There may be a primary and secondary SCM for redundancy purposes and its functionality may evolve into a multi-chassis environment. The NIM connects to the communication interfaces to the outside world and implements interface hardware specific components, as well as most of the protocol stacks necessary for normal packet processing. The packet operating system 114 (FIG. 1) may also include a special processing module ("SPM"), which is a specialized board that implements encryption, compression, etc. (possibly in hardware). Each NIM and SCM has zero or more distributed forwarding engines ("DFE"). A DFE may be implemented in software or may include hardware assist. A central routing engine ("CRE"), which is typically resident in the SCM, is responsible for routing table maintenance and lookups. The CRE or system label manager may also use a hardware assist. DFEs from both NIM and SCM consult to CRE for routing decisions, which may be cached locally on the NIMs.

The SCM may also include a resource broker, which is a service that registers, allocates and tracks system-wide resources of a given type. Entities that need a resource ask the resource broker for allocation of that resource. Entities may tell the resource broker how long they need the resource for. Based on the information provided by the client, the location of the client and resource, the capacity and current load of the resource, the resource broker allocates the resource for the client and returns a label to the client. The client notifies the resource broker when it is "done" with that resource. A resource may need to be allocated exclusively (e.g. a DSP) or may be shared (e.g. encryption sub-system). The resource broker service is provided on a per-VPN basis.

Figure 3:
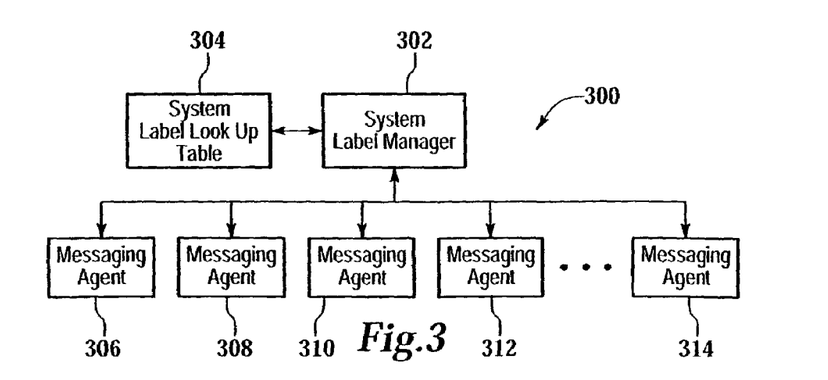
FIG. 3 is a block diagram of a packet operating system.

Now referring to FIG. 3, a block diagram of a packet operating system 300 is shown. The packet operating system 300 includes a system label manager 302, a system label repository or look up table 304 and one or more messaging agents 306, 308, 310, 312 and 314 (these messaging agents may correspond to any of the nodes 202, 204, 206, 208, 212, 214, 216, 218 in FIG. 2). The system label manager 302 responds to label lookup requests, and handles label registrations and de-registrations. In addition, the system label manager 302 maintains the uni-cast and multi-cast label databases typically located in the SCM. The uni-cast and multi-cast databases are collectively referred to as the system label repository or look up table 304, which can be a database or any other means of storing the labels and their associated destination addresses (labels). The uni-cast label database is a database of labels, their locations (e.g., node) in the system, associated attributes and flags. The multi-cast label database is a database of multicast labels, where each multicast label consists of a list of member uni-cast labels.

Messaging agents 306, 308, 310, 312 and 314, also referred to as node-messaging agents ("NMA"), can be local (e.g., same packet device) or remote (e.g., different packet device) to the system label manager 302. Moreover, messaging agents 306, 308, 310, 312 and 314 can be local or remote to one another. The messaging agents 306, 308, 310, 312 and 314 are the service that maintains the node local uni-cast and multi-cast label delivery databases, the node topology database and the multi-cast label membership database—collectively referred to as a local repository or look up table (See FIG. 4, look up table 403).

The packet network routes messages from one function instance to another regardless of the physical location of the destination function instance. Function instances and labels are an instantiation of some function and its state. Each function instance has a thread of execution that operates on that state to implement the protocol. Each function instance has a membership in a particular VPN partition. Each function instance is associated with a globally unique and centrally assigned identifier called a label. Labels facilitate effective and efficient addressing of function instances throughout the system and promote relocation of services throughout the system. Function instances communicate with one another by directing messages to these labels. The network also allows message multicasting, such that a multicast packet destined for two or more different NIMs is broadcast over the message fabric so that it is only sent once (if the fabric supports such an operation). Each NIM does its own duplication for its local interfaces. Moreover, well-known system services are also assigned labels. As a result, these services can be relocated in the system by just changing the decision tables to reflect their current location in the system.

The packet network uses a distributed messaging service to provide the communication infrastructure for the applications and thus hide the system (chassis/node) topology from the applications. The distributed messaging service is composed of a set of messaging agents 302 (on each node) and one system label manager 304 (on the SCM). The applications use a node-messaging interface to access the distributed messaging service. Most of the distributed messaging service is implemented as library calls that execute in calling application's context. A node-messaging task, which is the task portion of the distributed messaging service, handles the non-library portion of the distributed messaging service (e.g. reliable delivery retries, label lookups, etc.).

When new function instances are created, the system label manager 302 creates a unique label for the function instance and stores the label along with the destination address (label) of the function instance in the system label look up table 304. The system label manager 302 also sends the unique label and the destination address (label) for the function instance to the messaging agent 306, 308, 310, 312 or 314 that will handle messages for the function instance. The messaging agent 306, 308, 310, 312 or 314 stores the label along with the destination address (label) of the function instance in its local look up table. The system label manager 302 also receives requests for destination addresses (labels) from the messaging agents 306, 308, 310, 312 and 314. In such a case, the system label manager retrieves the destination address (label) for the requested label from the system label look up table 304 and sends the destination address (label) for the function instance to the requesting messaging agent 306, 308, 310, 312 or 314. The messaging agent 306, 308, 310, 312 or 314 stores the label along with the destination address (label) of the function instance in its local look up table. Whenever a label is destroyed, the system label manager 302 will either (1) notify all messaging agents 306, 308, 310, 312 and 314 that the label has been destroyed, or (2) keep a list of all messaging agents 306, 308, 310, 312 or 314 that have requested the destination address (label) for the destroyed label and only notify the listed messaging agents 306, 308, 310, 312 or 314 that the label has been destroyed.

Figure 4:
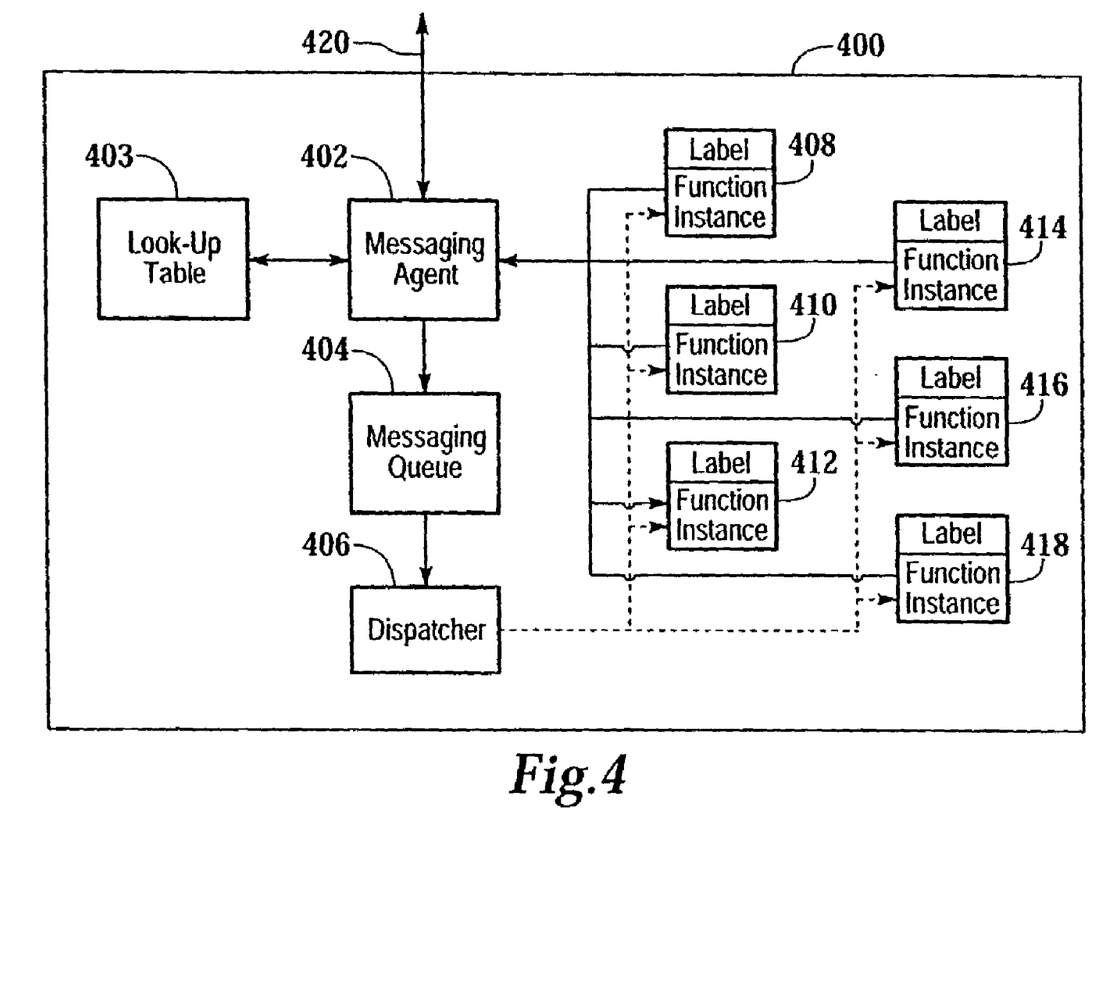
FIG. 4 is a block diagram of a local level of a packet operating system.

Referring now to FIG. 4, a block diagram of a local level 400 of the packet operating system is shown. The cards as mentioned in reference to FIG. 2, can include one or more local levels 400 of the packet operating system. For example, local level 400 can be allocated to a processor, such as a central processing unit on a control card, or a digital signal processor within an array of digital signal processors on a call processing card, or to the array of digital signal processors as a whole. The local level 400 includes a messaging agent 402, a local repository or look up table 403, a messaging queue 404, a dispatcher 406, one or more function instances 408, 410, 412, 414, 416 and 418, and a communication link 420 to the system label manager 302 (FIG. 3) and other dispatching agents. Look up table 403 can be a database or any other means of storing the labels and their associated destination addresses (labels). Note that multiple messaging queues 404 and dispatchers 406 can be used. Note also that each function instance 408, 410, 412, 414, 416 and 418 includes a label. The messaging agent 402 receives local messages from function instances 408, 410, 412, 414, 416 and 418, and remote messages from communication link 420.

When new function instances 408, 410, 412, 414, 416 or 418 are created within local level 400, the system label manager 302 (FIG. 3) sends the unique label and destination address (label) for the function instance 408, 410, 412, 414, 416 or 418 to messaging agent 402 via communication link 420. The messaging agent 402 stores the label along with the destination address (label) of the function instance 408, 410, 412, 414, 416 or 418 in its local look up table 403.

When the messaging agent 402 receives a message addressed to a function instance, either from communication link 420 or any of the function instances 408, 410, 412, 414, 416 or 418, the messaging agent 402 requests a destination address (label) for the function instance from the local repository or look up table 403. Whenever the local look up table 403 returns a destination address (label) that is local, the messaging agent 402 forwards the message to the local function instance 408, 410, 412, 414, 416 or 418. As shown, this process involves messaging agent 402 sending the message to messaging queue 404. Thereafter, the dispatcher 406 will retrieve the message from messaging queue 404 based on desired scheduling scheme, and forward the message to the appropriate function instance 408, 410, 412, 414, 416 or 418.

The desired scheduling scheme employed by dispatcher 406 varies depending upon the structure of messaging queue 404. Message traffic stored within queue 404 may be categorized and organized based on one or more classification scales. Depending upon the nature of the packet network and the operating system, numerous classification scales are possible. Each classification scale may have numerous internal priorities, and may differ in relative priority to other scales. For example, one scale may categorize message traffic in terms of packet classes (e.g., user data, control data) or VPN classes. Another scale may assign relative message priorities within each class, or attribute various weightings to each message within. Classification scale information, used to categorize a message, may be associated with the message in a system message block. For example, message class and priority information may be appended to a packet as, or included with other, header information. Any number of classification scales are possible, although most packet networks and operating systems will typically have somewhere between two and ten scales. The dimension of messaging queue 404 will equal the number of classification scales. For example, a system employing two classification scales will have a two-dimensional messaging queue.

Dispatcher 406 relies on a schedule to organize its processing of the messages delivered to queue 404. Messages of varying priority and importance are added to queue 404 at all times. The schedule utilized by dispatcher 406 must be repeatable and easy to generate, so that numerous iterations can be performed to update the schedule. Furthermore, the schedule must be easily scalable, to accommodate the classification scale dimensions.

According to the present invention, the task of generating a message schedule is broken down into small, efficient sub-processes. A countdown process accepts two sequences of inputs, based on two desired message classification scales. These classification scales are generally selected and interrelated such that one corresponds to priority classes and the other to weighting classes. The weighting classes are used as a countdown factor for each of the priority classes. The lowest weighting class corresponds to the highest priority class and vice versa. Other embodiments are also comprehended, requiring only that the members of one class serve as countdown factor for the members of the other class. The countdown process begins counting down the weights associated with each priority class. Once a weight reaches zero, its corresponding priority class is added to the schedule and the weight value is reset to its original value. The process continues iterating through the countdowns until all weights simultaneously reach zero—indicating completion of the schedule. All scale values reset, and the schedule may then be repeated with the same or different classification scales, or terminated.

Figure 5:
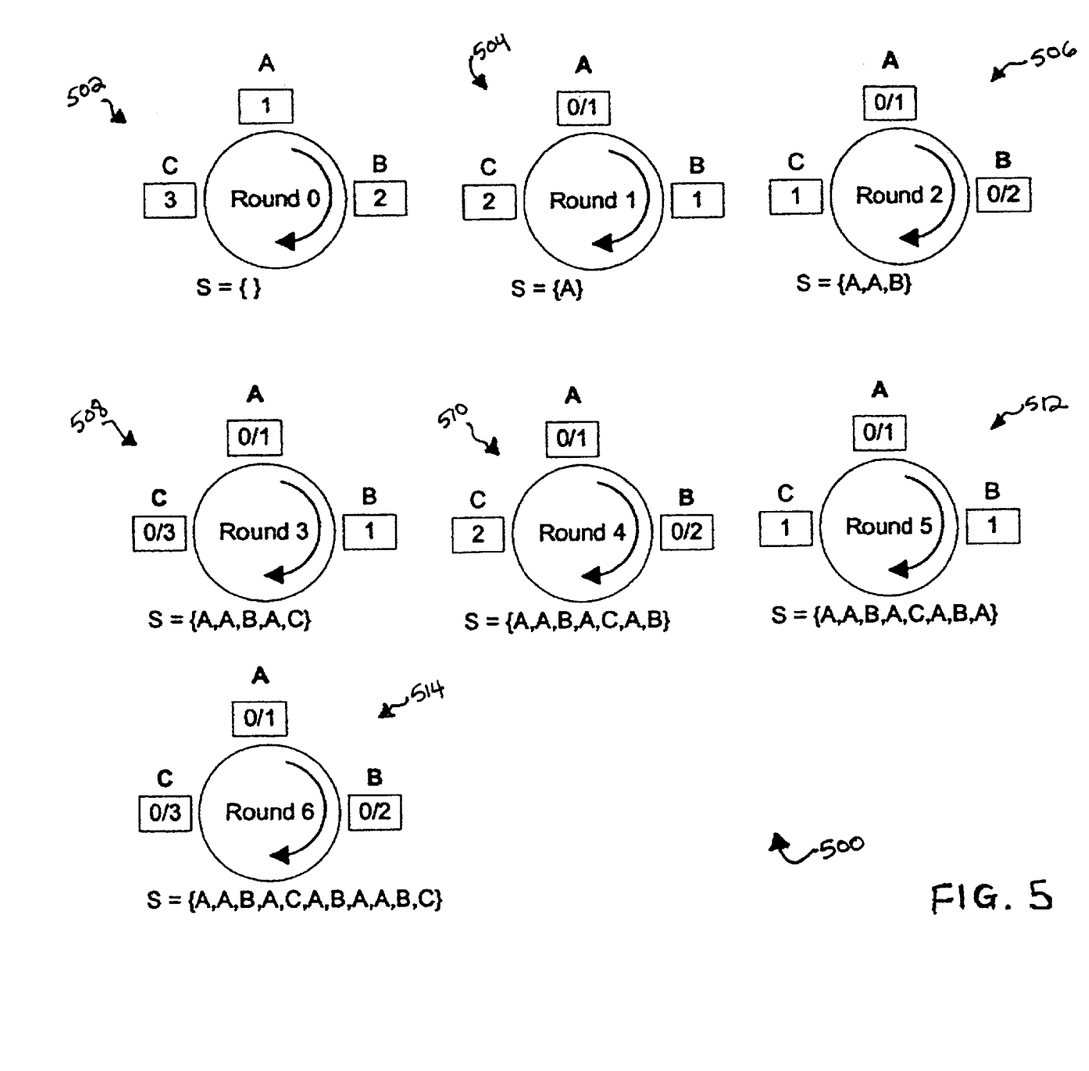
FIG. 5 is a diagram illustrating a count down process in accordance with the present invention.

Referring now to FIG. 5, a simple example of a countdown process 500 according to the present invention is illustrated. The countdown process has two input sequences—a priority class P, consisting of members {A, B, C}, and a weighting class consisting of members {1, 2, 3}. In this example, the members of the weighting class simply sequential positive real numbers. In other embodiments, however, members of the weighting class may exponentially weighted. For example: members of a weighting class having n members, and exponential value 2, would include {1, 2, 4, 8, . . . $2^n$}; members of a weighting class having n members, and exponential value 3, would include {1, 3, 9, 27, . . . $3^n$}, and so forth. Alternative weighting classes, exploiting other numeric relationships between constituent members, are also comprehended by the present invention. Although they may be something other than numeric in nature (e.g., letters of the alphabet, colors), members of the weighting class are preferably numeric in nature—in order to simplify the computations and counting relating to the present invention. Process 500 outputs scheduling sequence S.

In process 500, highest priority A is associated with lowest weight 1. Priority B is associated with weight 2, and lowest priority C is associated with weight 3. Beginning with priority A, and progressing sequentially, the weight values associated with each priority are decremented, or counted down, by 1. Decrementing the weight value associated with priority C completes one round of counting down. If, during any given round, the weight value associated with a given priority is decremented to zero, that priority member is added to schedule S, and the weight is reset to its original value. If, during any given round, the weight values for all priority members are counted down to zero, schedule S terminates. Process 500 may be re-started using the same or different input sequences, or may be completely terminated.

In process 500, process segment 502 corresponds to Round 0, the initialization state of process 500. Schedule S is empty, weight 1 is associated with priority A, weight 2 is associated with priority B, and weight 3 is associated with priority C. As configured, priority A is added to schedule S during every round. Priority B is added every other round, and priority C is added every third round. Process segment 504 corresponds to Round 1, and count down begins. Priority A's weight is decremented to zero, so priority A is added to schedule S and its weight is reset to 1. Priority B's weight is decremented to 1, and priority C's weight is decremented to 2. Round 1 is complete, S={A}, and count down moves on to Round 2, represented by process segment 506. Priority A's weight decrements to zero, so priority A is added to schedule S and its weight is reset to 1. Priority B's weight decrements to zero, so priority B is added to schedule S and its weight is reset to 2. Priority C's weight decrements to 1. Round 2 is complete, S={A, A, B}, and count down moves on to Round 3, represented by process segment 508. Priority A's weight decrements to zero, so priority A is added to schedule S and its weight is reset to 1. Priority B's weight decrements to 1. Priority C's weight decrements to zero, so priority C is added to schedule S and its weight is reset to 3. Round 3 is complete, S={A, A, B, A, C}, and count down moves on to Round 4, represented by process segment 510. Priority A's weight decrements to zero, so priority A is added to schedule S and its weight is reset to 1. Priority B's weight decrements to zero, so priority B is added to schedule S and its weight is reset to 2. Priority C's weight decrements to 2. Round 4 is complete, S={A, A, B, A, C, A, B}, and count down moves on to Round 5, represented by process segment 512. Priority A's weight decrements to zero, so priority A is added to schedule S and its weight is reset to 1. Priority B's weight decrements to 1, and priority C's weight decrements to 1. Round 5 is complete, S={A, A, B, A, C, A, B, A}, and count down moves on to Round 6, represented by process segment 514. Priority A's weight decrements to zero, so priority A is added to schedule S and its weight is reset to 1. Priority B's weight decrements to zero, so priority B is added to schedule S and its weight is reset to 2. Priority C's weight decrements to zero, so priority C is added to schedule S and its weight is reset to 3. All three weights counted down to zero during Round 6. Thus, process 500 terminates at the end of Round 6, when S={A, A, B, A, C, A, B, A, A, B, C}.

The countdown process illustrated above may be expressed by the following logic algorithm:

```
procedure countdown (P, W) returns S
    P = {p₁, p₂, ... pₙ}; priority pᵢ > pᵢ₊₁ ∀ i ∈ {1, 2, 3, ... n}
    W = {w₁, w₂, ... wₙ}; wᵢ ∈ {1, 2, 3, ... ∞};
    wᵢ ≤ wᵢ₊₁ ∀ i ∈ {1, 2, 3, ... n}
    let S = { }
    let RW = W : rwᵢ = wᵢ ∀ i ∈ {1, 2, 3, ... n}
    set bitmask B = 0
    while TRUE
    do
        for (i = 1 ... n)
        do
            rwᵢ = rwᵢ - 1
            if rwᵢ = 0 then
                S = S ∪ {pᵢ}
                rwᵢ = wᵢ
                set bit position i in B
            endif
        done
        if all bit positions {1, 2, 3 ... n} set in B then
            return S
        endif
        B = 0
    done
```

Based on input sequences P (i.e., priority) and W (i.e., weight), the output of this algorithm is schedule S. This particular embodiment of the countdown process comprises an auxiliary set RW, to keep a running count of the weights W, and a bitmask B, to track whether all priorities P were added to S during a single round. This simple logic algorithm may be operationally implemented in a number of practical applications, such as a software program or subroutine (e.g., a C++ program), firmware, or even hardware (e.g., counter and register circuitry). Other algorithms expressing the requirements and relationships of the countdown process are comprehended by the present invention.

The number of countdown iterations (i.e., rounds) necessary for a given set of inputs to terminate, and the total number of elements in the schedule, are easily determined. The number of rounds (NR) necessary for a given set of inputs to terminate simply equals the least common multiple (LCM) of all weights specified in the weighting class. In the example illustrated in FIG. 5, the weights in W were (1, 2, 3). Thus, the LCM equaled 6—indicating the number of rounds it took to complete schedule S. The number of elements in schedule S ($N_s$) may be calculated by the following equation:

$$N_S = N_R \times \sum_{i=1}^{n}(1/w_i); \quad (1)$$

where n is the number of elements in W. Thus, for the example illustrated in FIG. 5, equation one translates to:

$$N_S = 6 \times [(\tfrac{1}{1}) + (\tfrac{1}{2}) + (\tfrac{1}{3})] = 11.$$

Referring back to the conclusion of process segment 514, there are 11 elements in schedule S.

Once generated, schedules may be interleaved together to form one messaging master schedule. This is necessary when numerous classification scales are utilized—i.e., when the messaging queue is of a dimension of 3 or greater. Consider, for example, schedule S developed in process 500. Assume that S applies to three VPN classes (A, B, C), and provides a messaging prioritization schedule among those three classes. Now, assume that another schedule, S'={1, 1, 2, 1, 3, 1, 2, 1, 1, 2, 3}, applies to three priorities (1, 2, 3) within each class A, B, and C. Primary schedules S and secondary schedule S' may be interleaved together using a count down process in accordance with the present invention. This example is illustrated now with reference to FIG. 6.

Figure 6:
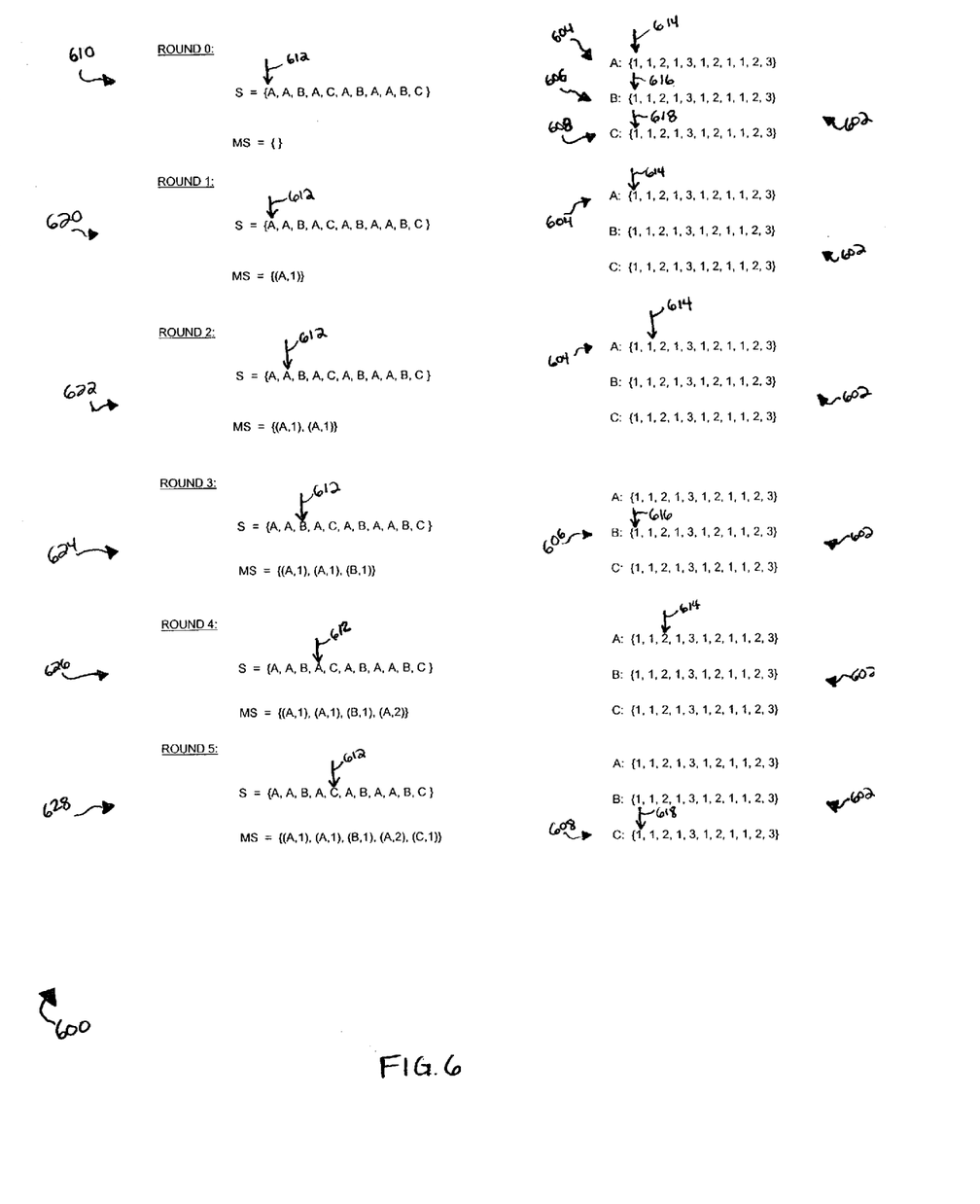
FIG. 6 is a diagram illustrating a count down process in accordance with the present invention.

FIG. 6 illustrates a count down process 600 by which schedules S and S' may be interleaved together, forming master schedule MS in accordance with the present invention. In process 600, an array 602 is formed, comprising several row elements. Row element 604 comprises class element A matched with a copy of schedule S'. This represents the application of the three priorities of S' within class A. Row element 606 comprises class element B matched with a copy of schedule S'. This represents the application of the three priorities of S' within class B. Row element 608 comprises class element C matched with a copy of schedule S'. This represents the application of the three priorities of S' within class C.

Process segment 610 corresponds to Round 0, the initialization state of process 600. During Round 0, master schedule MS is empty. Pointers are allocated to the members of schedule S, and to the members of elements 604. Pointer 612 is set to the first entry in S, which is A. Pointer 614 is set to the first entry of the element 604. Pointer 616 is set to the first entry of the element 606. Pointer 618 is set to the first entry of the element 608. Process segment 620 corresponds to Round 1, which begins the count down.

In Round 1, the entry at pointer 612, which is "A", is read and the pointer is shifted to the next entry in S. Because the value read at pointer 612 was "A", element 604 is selected, and the entry at pointer 614, which is "1", is read. Pointer 614 is shifted to the next entry in element 604. The class read from S (i.e., "A") and the priority within that class (i.e., "1"), read from S', are combined and entered into MS as (A,1). Operation moves to Round 2, represented by process segment 622. The entry at pointer 612, which is "A", is read and the pointer is shifted to the next entry in S. Because the value read at pointer 612 was "A", element 604 is selected, and the entry at pointer 614, which is "1", is read. Pointer 614 is shifted to the next entry in element 604. The class read from S (i.e., "A") and the priority within that class (i.e., "1"), read from S', are combined and entered into MS as (A,1). MS now equals {(A,1), (A,1)}. Operation now moves to Round 3, represented by process segment 624. The entry at pointer 612, which is "B", is read and the pointer is shifted to the next entry in S. Because the value read at pointer 612 was "B", element 606 is selected, and the entry at pointer 616, which is "1", is read. Pointer 616 is shifted to the next entry in element 606. The class read from S (i.e., "B") and the priority within that class (i.e., "1"), read from S', are combined and entered into MS as (B,1). MS now equals {(A,1), (A,1), (B,1)}. Operation now moves to Round 4, represented by process segment 626. The entry at pointer 612, which is "A", is read and the pointer is shifted to the next entry in S. Because the value read at pointer 612 was "A", element 604 is selected, and the entry at pointer 614, which is "2", is read. Pointer 614 is shifted to the next entry in element 604. The class read from S (i.e., "A") and the priority within that class (i.e., "2"), read from S', are combined and entered into MS as (A,2). MS now equals {(A,1), (A,1), (B,1), (A,2)}. Operation continues on to Round 5, represented by process segment 628. The entry at pointer 612, which is "C", is read and the pointer is shifted to the next entry in S. Because the value read at pointer 612 was "C", element 608 is selected, and the entry at pointer 618, which is "1", is read. Pointer 618 is shifted to the next entry in element 608. The class read from S (i.e., "C") and the priority within that class (i.e., "1"), read from S', are combined and entered into MS as (C,1). MS now equals {(A,1), (A,1), (B,1), (A,2), (C,1)}. Operation continues counting down in this manner until the last entry in S has been read and pointer 612 has been reset. Master schedule MS may be terminated at this point or, depending upon the application, operation may continue counting down the entries in S with or without resetting the positions of pointers 614, 616 and 618. Alternatively, other schedules may be interleaved with MS in a similar fashion.

Process 600 may be implemented in a number of logic algorithms, each of which may be operationally implemented in a number of practical applications, such as a software programs or sub-routine (e.g., a C++ program), firmware, or even hardware (e.g., counter and register circuitry). Using the count down process of the present invention, any number of schedules characterizing any number of classification scales may be efficiently and repeatably combined into a single, efficient messaging schedule.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A system for scheduling packet transfer in a packet network comprising:
   a first characterization scale having a number of elements;
   a second characterization scale having a number of elements; and
   a count down process that produces a packet transfer schedule by associating an element of the first characterization scale with at least one element of the second characterization scale and by adding an element of the second characterization scale to the packet transfer schedule based on a counting of the elements of the first characterization scale wherein the first characterization scale comprises elements having sequential exponential weights relative to one another.

2. The system of claim 1, wherein the count down process produces the packet transfer schedule by adding an element of the first characterization scale and an element of the second characterization scale to the packet transfer schedule based on a counting of the elements of the first characterization scale.

3. The system of claim 1, wherein the first characterization scale comprises a weighting scale.

4. The system of claim 1, wherein the second characterization scale comprises a priority scale.

5. The system of claim 1, wherein the first characterization scale comprises numeric elements.

6. The system of claim 5, wherein elements of the first characterization scale having higher relative numeric value are associated with elements of the second characterization scale having lower relative priority.

7. The system of claim 1, wherein the first and second characterization scales comprise schedules.

8. The system of claim 1, wherein the system is implemented using software.

9. A method of producing a message transfer schedule, comprising the steps of:
  providing a first characterization scale, having a number of elements;
  providing a second characterization scale, having a number of elements;
  associating each element of the first characterization scale with an element of the second characterization scale;
  sequentially shifting through each element of the first characterization scale to count down the associated elements of the second characterization scale; and
  adding an element of the first characterization scale, when its associated element of the second characterization scale has counted down to a selected value, to a schedule.

10. The method of claim 9, wherein the step of providing a first characterization scale comprises providing a priority scale.

11. The method of claim 10, wherein the step of providing a second characterization scale comprises providing a weighting scale.

12. The method of claim 11, wherein the step of associating each element of the priority scale with an element of the weighting scale comprises associating sequentially higher weights with sequentially lower priorities.

13. The method of claim 11, wherein the weighting scale comprises numeric elements.

14. The method of claim 13, wherein the weighting scale comprises elements having sequential exponential weights relative to one another.

15. The method of claim 11, further comprising the step of resetting each element of the second characterization scale to its original value once it has been counted down to the selected value.

16. The method of claim 15, further comprising the step of terminating the schedule when all elements of the second characterization scale reset in immediate succession.

17. A method of generating a schedule for delivery of packets from a queue within a packet-based operating system, comprising the steps of:
  providing a priority scale having one or more priority elements;
  providing a weighting scale having one or more weighting elements;
  providing a reset value;
  associating a weighting element with each priority element;
  systematically decrementing the value of each such associated weighting element;
  adding a priority element to the schedule when its associated weighting element has decremented to the reset value;
  resetting the weighting element to its original value; and
  assigning a priority element to each packet in the queue.

* * * * *